(12) United States Patent
Yahata et al.

(10) Patent No.: US 9,624,107 B2
(45) Date of Patent: Apr. 18, 2017

(54) METHOD FOR PRODUCING DIFLUOROPHOSPHATE

(71) Applicant: STELLA CHEMIFA CORPORATION, Osaka (JP)

(72) Inventors: Naoki Yahata, Osaka (JP); Tetsuo Nishida, Osaka (JP); Shuichi Minamigawa, Osaka (JP)

(73) Assignee: Stella Chemifa Corporation, Osaka (JP)

( * ) Notice: Subject to any disclaimer, the term of this patent is extended or adjusted under 35 U.S.C. 154(b) by 0 days.

(21) Appl. No.: 14/418,720

(22) PCT Filed: Jun. 6, 2014

(86) PCT No.: PCT/JP2014/065086
§ 371 (c)(1),
(2) Date: Jan. 30, 2015

(87) PCT Pub. No.: WO2014/196627
PCT Pub. Date: Dec. 11, 2014

(65) Prior Publication Data
US 2016/0075556 A1  Mar. 17, 2016

(30) Foreign Application Priority Data

Jun. 7, 2013  (JP) ................. 2013-121328

(51) Int. Cl.
| C01B 25/455 | (2006.01) |
| H01G 11/62 | (2013.01) |
| H01M 10/0568 | (2010.01) |
| H01M 10/052 | (2010.01) |

(52) U.S. Cl.
CPC ............ *C01B 25/455* (2013.01); *H01G 11/62* (2013.01); *H01M 10/052* (2013.01); *H01M 10/0568* (2013.01)

(58) Field of Classification Search
None
See application file for complete search history.

(56) References Cited

U.S. PATENT DOCUMENTS

2011/0111288 A1* 5/2011 Nishida ................ C01B 25/455
429/199

FOREIGN PATENT DOCUMENTS

| DE | 813848 | 9/1951 |
| JP | 3439085 | 6/2003 |
| JP | 2005-053727 A | 3/2005 |
| JP | 2005-219994 A | 8/2005 |
| JP | 2005-306619 A | 11/2005 |
| JP | 2006-143572 A | 6/2006 |
| JP | 2010-155773 A | 7/2010 |
| JP | 2010-155774 A | 7/2010 |
| JP | 2012-51752 A | 3/2012 |

OTHER PUBLICATIONS

Lange, "Über die Difluorphosphorsaure and ihre der Perchlorsäure ahnliche Salzbildung," Ber.Dtsch.Chem., Ges.B26, pp. 786-792 (1929).
Lange et al., "Studies of Fluorophosphoric Acids and Their Derivatives. XIII. Preparation of Anhydrous Monofluorophosphoric Acid," *J. Am. Chem. Soc.*, vol. 69(5), pp. 1073-1076 (May 1947).
Lange, Zh.Neorgan.Khim.,7, pp. 1313-1315 (1962).
Matsumoto et al., "A New Series of Ionic Liquids Based on the Difluorophosphate Anion," *Inorganic Chemistry*, vol. 48(15), pp. 7350-7358 (2009).
Matsumoto et al., "Properties of $PO_2F_2$-based ionic liquids as electrolytes for electric double layer capacitors," Proceedings of the 77th Electrochemical Society in Japan 1/18.
Schülke et al., Proceedings of 44th Japan Society for Analytical Chemistry, p. 536 (1994).
Thompson et al., "Preparation and infrared spectra of alkali metal difluorophosphates," *Inorg. Nucl. Chem. Letters*, vol. 5, pp. 581-585 (1969).
Vast et al., "Etude methodologique de la synthase des difluorodioxophosphates metalliques a partir de l'oxyde du difluorure de Phosphoryle," *Journal of Fluorine Chemistry*, vol. 38, pp. 297-302 (1988).

\* cited by examiner

*Primary Examiner* — Wayne Langel
(74) *Attorney, Agent, or Firm* — Knobbe Martens Olson & Bear LLP

(57) ABSTRACT

Provided is a method for producing a difluorophosphate, which can easily and industrially advantageously produce a high-purity difluorophosphate. The method includes a step of producing a difluorophosphate in the fluorophosphoric acid solution by reacting hydrofluoric acid anhydride containing no solvent with an oxoacid and/or the like of phosphorous to produce a fluorophosphoric acid solution; a step of adding a hexafluorophosphate to the fluorophosphoric acid solution in the absence of respective halides, carbonates, borates, phosphates, hydroxides, and oxides of an alkali metal and the like; and a step of heating and drying the fluorophosphoric acid solution containing the difluorophosphate to distill away a fluorophosphoric acid, or a step of depositing the difluorophosphate in the fluorophosphoric acid solution by crystallization, subsequently separating the difluorophosphate by solid-liquid separation, and distilling away a fluorophosphoric acid contained in the difluorophosphate after the solid-liquid separation.

6 Claims, No Drawings

METHOD FOR PRODUCING DIFLUOROPHOSPHATE

CROSS-REFERENCE TO RELATED APPLICATIONS

This application is the U.S. National Phase under 35 U.S.C. §371 of International Application PCT/JP2014/065086, filed Jun. 6, 2014, which claims priority to JP 2013-121328, filed Jul. 6, 2013.

TECHNICAL FIELD

The present invention relates to method for producing a difluorophosphate which can easily and industrially advantageously produce a high-purity difluorophosphate.

BACKGROUND ART

In recent years, investigations have been actively advanced for applying an ionic liquid as an electrolytic solution for batteries or electric double layer capacitors, and for using an ionic liquid as a plating bath. In conventional batteries or electric double layer capacitors, an aqueous electrolytic solution or an organic electrolytic solution has been used as an electrolytic solution. However, the aqueous electrolytic solution has the problem of being restricted about the decomposition voltage of water. The organic electrolytic solution has problems about heat resistance and safety. By contrast, an ionic liquid has characteristics preferable for safety, such as flame resistance and nonvolatility, and is also high in electrochemical stability. The ionic liquid is therefore suitable, in particular, for an electrolytic solution for batteries or electric double layer capacitors used in a high-temperature environment.

In order to use an ionic liquid as an electrolytic solution for batteries or electric double layer capacitors, investigations have been advanced about various types of ionic liquids each composed of a cation and an anion. For example, Non-Patent Document 1 reports properties of 1-ethyl-3-methylimidazolium difluorophosphate, which has a difluorophosphate as an anion, as an ionic liquid. Non-Patent Document 2 reports that the 1-ethyl-3-methylimidazolium difluorophosphate has electroconductivity and voltage resistance equivalent to those of 1-ethyl-3-methylimidazolium tetrafluoroborate, which is known as a typical ionic liquid, and can be suitably used for an electrolyte for electric double layer capacitors.

According to Non-Patent Document 1, in a method for producing the 1-ethyl-3-methylimidazolium difluorophosphate, the 1-ethyl-3-methylimidazolium difluorophosphate can be produced by reacting 1-ethyl-3-methylimidazolium chloride with potassium difluorophosphate in acetone, filtering off potassium chloride produced as a by-product from the solution in acetone, allowing the remaining solution to act onto an alumina column, and then distilling away acetone therefrom. Impurities in an electrolytic solution remarkably affect performances of batteries or electric double layer capacitors; thus, when an ionic liquid is used as an electrolytic solution, it is preferred to reduce impurities as much as possible. The ionic liquid is hardly volatile, and is also in a liquid state within a broad temperature range, so that the impurities are not easily reduced by a purifying method such as distillation or recrystallization. It is therefore necessary for synthesizing a high-purity ionic liquid to use a high-purity raw material. Thus, it is desired in the production method disclosed in Non-Patent Document 1 that the amount of impurities contained in potassium difluorophosphate to be used is as small as possible.

Methods for producing a difluorophosphate such as potassium difluorophosphate are disclosed in, for example, Patent Documents 1 to 8 and Non-Patent Documents 3 to 7 listed below.

Non-Patent Documents 3 and 4 each disclose a method of allowing ammonium fluoride or acidic sodium fluoride to act onto diphosphorous pentaoxide to provide a difluorophosphate. However, in the respective production methods disclosed in these documents, besides the difluorophosphate, a monofluorophosphate, a phosphate, and water are produced as by-products in large amounts. Accordingly, a large burden is imposed on a subsequent purifying step. Thus, it is not easily mentioned that these methods are effective methods.

Non-Patent Document 5 discloses a method of allowing $P_2O_3F_4$ (difluorophosphoric anhydride) to act onto, for example, an oxide or hydroxide such as $Li_2O$ or LiOH to produce a difluorophosphate. However, difluorophosphoric anhydride is very expensive, and high-purity difluorophosphoric anhydride is not easily available. Thus, this production method is disadvantageous for industrial production.

Patent Document 1 discloses a method of mixing potassium hexafluorophosphate with potassium metaphosphate, and melting the mixture to provide potassium difluorophosphate. However, this production method has the following problem: potassium difluorophosphate is contaminated by a crucible used at the time of melting potassium hexafluorophosphate and potassium metaphosphate. For the melting, it is also necessary to realize an environment of a high temperature such as 700° C. From the viewpoints of product purity and productivity, the production method disclosed in Patent Document 1 cannot be said to be a preferable method.

Non-Patent Document 6 discloses a method of melting urea, potassium dihydrogenphosphate, and ammonium fluoride to react these compounds with one another, thereby producing potassium difluorophosphate. In this production method, the reaction temperature can be lowered to about 170° C. In light of a comparison of this condition with reaction conditions in Patent Document 1, this production method makes it possible to realize industrial production. However, there remain the following problems: it is necessary to dispose of a large amount of ammonia gas produced as a by-product, and a large amount of ammonium fluoride also remains. Thus, from the viewpoints of production efficiency and product purity, the production method disclosed in Non-Patent Document 6 is not preferable, either.

Non-Patent Document 7 discloses a method of: reacting an alkali metal chloride with excessive difluorophosphoric acid; heating and drying hydrogen chloride, which is produced as a by-product, and a surplus of difluorophosphoric acid under reduced pressure to be distilled away; and then obtaining a difluorophosphate. However, even when difluorophosphoric acid sufficiently high in purity is used, a monofluorophosphate and a fluoride salt remain as impurities in large amounts in the difluorophosphate obtained by this method. It is therefore also difficult that the production method disclosed in Non-Patent Document 7 provides a high-purity difluorophosphate.

Patent Documents 2 to 4 each disclose a method of reacting lithium hexafluorophosphate with a borate, silicon dioxide and a carbonate in a nonaqueous solvent to provide lithium difluorophosphate. Moreover, Patent Document 5 discloses a method of bringing a carbonate or borate into contact with a gas such as phosphorous pentafluoride to provide lithium difluorophosphate. However, the production methods disclosed in these documents require a process over a long time of, for example, 40 to 170 hours for providing a difluorophosphate. Thus, these methods are unsuitable for industrial production.

Patent Document 6 describes a method of reacting an oxoacid or oxyhalide of phosphorous with a hexafluorophosphate, a halide of an alkali metal, and the like in the presence of hydrogen fluoride to provide a difluorophosphate. According to this method, the hexafluorophosphate acts, through the presence thereof, effectively onto contaminated water so that a high-purity difluorophosphate can be obtained. However, the hexafluorophosphate, which is expensive, is used in a relatively large amount, and further according to methods described in Examples therein, an exhaust gas or waste fluid containing a large amount of phosphorous and fluorine is generated to cause the following problem: the separation and recovery of useful substances, and waste disposal are complicated.

Patent Document 7 discloses a method of reacting a halide of an alkali metal or the like with difluorophosphoric acid in the presence of a hexafluorophosphate to produce a difluorophosphate. Patent Document 8 discloses a method of reacting difluorophosphoric acid with a halide or the like of an alkali metal in difluorophosphoric acid, and providing a difluorophosphate in difluorophosphoric acid by a crystallizing operation. In these production methods, it is necessary to use a high-purity difluorophosphoric acid. However, difluorophosphoric acid is high in corrosive property; thus, reduced pressure distillation or the like is required, and further facilities for the production are complicated. There is also caused the following problem: it is difficult to industrially gain difluorophosphoric acid regardless of the purity thereof.

In the meantime, a high-purity difluorophosphate can be used not only as a raw material of an ionic liquid but also as an additive for an electrolytic solution for lithium secondary batteries. In recent years, as a field to which lithium secondary batteries are applied enlarges from that of electronic instruments such as portable phones, personal computers and digital cameras to that of articles mounted on automobiles, a further rise in performances thereof has been advanced, for example, the power density and the energy density are improved, and a loss in the capacity is restrained. Lithium secondary batteries used, particularly, in articles mounted in automobiles may be exposed to a severer environment than ones used in consumer products; accordingly, the batteries are required to have a high reliability in terms of cycle life and storage performance. An electrolytic solution used in lithium secondary batteries is a nonaqueous electrolytic solution in which a lithium salt is dissolved in an organic solvent. The decomposition of such a nonaqueous electrolytic solution, and a side reaction thereof affect the performance of the lithium secondary batteries. Consequently, attempts have been made for improving the batteries in cycle life and storage performance by mixing various additives with the nonaqueous electrolytic solution.

For example, Patent Document 9 discloses that an organic solvent, as a nonaqueous electrolytic solution for lithium secondary batteries, contains at least one of lithium monofluorophosphate and lithium difluorophosphate as an additive. Patent Document 9 states that the use of such a nonaqueous electrolytic solution makes it possible to form a film onto a positive electrode and a negative electrode, respectively, thereby restraining the electrolytic solution from being decomposed by contact between the nonaqueous electrolytic solution, and a positive active material and a negative active material. Thus, the battery can be restrained from undergoing self-discharge and be improved in storage performance.

PRIOR ART DOCUMENTS

Patent Documents

Patent Document 1: German Patent No. 813848
Patent Document 2: JP-A-2005-53727
Patent Document 3: JP-A-2005-219994
Patent Document 4: JP-A-2005-306619
Patent Document 5: JP-A-2006-143572
Patent Document 6: JP-A-2010-155774
Patent Document 7: JP-A-2010-155773
Patent Document 8: JP-A-2012-51752
Patent Document 9: Japanese Patent No. 3439085

Non-Patent Documents

Non-Patent Document 1: K. Matsumoto and R. Hagiwara, Inorganic Chemistry, 2009, 48, 7350-7358
Non-Patent Document 2: The Electrochemical Society of Japan, $77^{th}$ Conference, Proceedings, 1I18
Non-Patent Document 3: Ber. Dtsch. Chem., Ges. B26 (1929) 786 Non-Patent Document 4: Zh. Neorgan. Khim., 7 (1962) 1313-1315
Non-Patent Document 5: Journal of Fluorine Chemistry, 38 (1988) 297-302
Non-Patent Document 6: The Japan Society for Analytical Chemistry, $43^{th}$ Annual Convention, Summaries, 536 (1994)
Non-Patent Document 7: Inorganic Nuclear Chemistry Letters, Vol. 5 (1969) 581-585

SUMMARY OF THE INVENTION

Problems to be Solved by the Invention

The present invention has been made in light of the above-mentioned problems, and an object thereof is to provide a method for producing a difluorophosphate, which can easily and industrially advantageously produce a high-purity difluorophosphate.

Solutions to the Problems

In order to solve the problems in the prior art, the present inventors have investigated a method for producing a difluorophosphate. As a result, the present inventors have found out that by adopting the following configuration, a high-purity difluorophosphate can be synthesized by an industrially advantageous method. Thus, the present invention has been achieved.

In order to solve the above-mentioned problems, the method for producing a difluorophosphate, comprising: a step of producing a fluorophosphoric acid solution by reacting hydrofluoric acid anhydride containing no organic solvent with at least one member selected from the group consisting of an oxoacid, an oxoacid anhydride, and an oxyhalide of phosphorous; a step of producing a difluorophosphate in the fluorophosphoric acid solution by adding a hexafluorophosphate to the fluorophosphoric acid solution in the absence of at least any one of respective halides, carbonates, borates, phosphates, hydroxides, and oxides of an alkali metal, an alkaline earth metal, aluminum, and an onium; and a step of heating and drying the fluorophosphoric acid solution containing the difluorophosphate to distill away a fluorophosphoric acid, or a step of depositing the difluorophosphate in the fluorophosphoric acid solution by crystallization, subsequently separating the difluorophosphate by solid-liquid separation, and further distilling away a fluorophosphoric acid contained in the difluorophosphate after the solid-liquid separation.

According to the above configuration, first, the production of a fluorophosphoric acid is performed by reacting at least one member selected from the group consisting of an oxoacid, an oxoacid anhydride, and an oxyhalide of phosphorous (hereinafter, referred to as "the oxoacid and the like of phosphorous") with hydrofluoric acid anhydride. Reaction between the oxoacid and the like of phosphorous and hydrogen fluoride is very intense; thus, in the case of attempting to simultaneously react the compound(s) with a hexafluorophosphate to synthesize a difluorophosphate, it may be difficult to obtain the difluorophosphate with desired composition. As a result, a product finally obtained as the difluorophosphate does not easily gain a high quality, either. Accordingly, in order to relieve the reactivity thereof, the reaction may be conducted in a large amount of an organic solvent. However, in the present invention, a fluorophosphoric acid is beforehand synthesized, and after the synthesis this acid is reacted with a hexafluorophosphate to synthesize a difluorophosphate. It is therefore possible to produce a high-quality difluorophosphate with desired composition.

In the present invention, a fluorophosphoric acid is synthesized without using an organic solvent, so that a countermeasure against exposure to an organic solvent is unnecessary. Thus, the specification of facilities for the production can be prevented from being complicated. The use of an organic solvent causes the following problem: in the organic solvent after the production of the fluorophosphoric acid, acids such as fluorophosphoric acid and hydrogen fluoride are produced as by-products so that the separation of the useful substances and waste disposal are complicated. However, in the present invention, problems about the separation and recovery of such useful substances, the waste disposal, and the like can also be removed.

The step of producing the difluorophosphate is performed in the state that the following is not present: at least any one of respective halides, carbonates, borates, phosphates, hydroxides and oxides of an alkali metal, an alkaline earth metal, aluminum, and an onium. This makes it possible to prevent the generation of insoluble components resulting from the compound(s). Additionally, the raw materials used are reduced so that the present method can be improved in productivity, and further new impurities (particularly, water) can be prevented from being taken therewith. As a result, the production of a high-quality difluorophosphate can be attained.

Furthermore, in the above configuration, for separating the difluorophosphate produced in the fluorophosphoric acid solution, this acid solution is heated and dried to distill away the fluorophosphoric acid. Alternatively, a deposit deposited by a crystallizing operation in the fluorophosphoric acid solution in which the difluorophosphate is produced is separated from the fluorophosphoric acid by solid-liquid separation, and then the fluorophosphoric acid contained in the deposit is distilled away. This makes it possible to provide a high-purity difluorophosphate.

In the above configuration, it is preferred that in the above-mentioned step of producing the fluorophosphoric acid solution, the at least one member selected from the group consisting of an oxoacid, an oxoacid anhydride, and an oxyhalide of phosphorous is mixed with the hydrofluoric acid anhydride while the oxoacid(s) of phosphorous and the hydrofluoric acid anhydride are cooled in the range of $-40°$ C. to 10° C. By conducting the reaction between the oxoacid and the like of phosphorous and hydrofluoric acid anhydride while the reaction system is cooled to 10° C. or lower, for example, ones low in boiling point, out of all the fluorophosphoric acids obtained by the reaction, are restrained from being evaporated. Thus, it is possible to prevent a fluorophosphoric acid having target composition from not being obtained. In other words, the oxoacid and the like of phosphorous and hydrofluoric acid anhydride are mixed with each other while cooled, whereby the reactivity thereof can be controlled. The temperature of the mixed liquid of the oxoacid and the like of phosphorous and hydrofluoric acid anhydride is preferably $-40°$ C. or higher. This makes it possible to prevent an increase in the viscosity of the mixed liquid to prevent a decrease in the stirring efficiency of the liquid.

Moreover, in the above configuration, it is preferred that in the above-mentioned step of producing a difluorophosphate in the fluorophosphoric acid solution is performed by keeping the temperature of the fluorophosphoric acid solution in the range of $-40°$ C. to 100° C. at the time of adding the hexafluorophosphate to the fluorophosphoric acid solution. By keeping the temperature of the fluorophosphoric acid solution in the range of $-40$ to 100° C., the hexafluorophosphate can be prevented from being decomposed, so that the difluorophosphate can be stably produced. The temperature of the fluorophosphoric acid solution is preferably $-40°$ C. or higher. This makes it possible to prevent an increase in the viscosity of the fluorophosphoric acid solution to prevent a decrease in the stirring efficiency of the solution.

Moreover, in the above configuration, it is preferred that any of the following steps is repeated: a step of adding, to the fluorophosphoric acid solution after the solid-liquid separation, a hexafluorophosphate, or a hexafluorophosphate and a fluorophosphoric acid, and subsequently heating and drying the resultant to distill away a surplus of the fluorophosphoric acid; and a step of separating, by solid-liquid separation, a deposit deposited by crystallizing the fluorophosphoric acid including the difluorophosphate, and further distilling away the fluorophosphoric acid contained in the deposit. This makes it possible to reuse the fluorophosphoric acid solution subjected to the solid-liquid separation, again, for a reaction thereof with the hexafluorophosphate. Thus, costs for the production can be decreased.

Moreover, in the above configuration, it is preferred that the hexafluorophosphate is lithium hexafluorophosphate.

Effects of the Invention

The present invention produces the following effects by the configurations described above:

According to the present invention, the production of a fluorophosphoric acid is performed by reacting at least one member selected from the group consisting of an oxoacid, an oxoacid anhydride, and an oxyhalide of phosphorous with hydrofluoric acid anhydride without using an organic solvent, so that a countermeasure against exposure to the organic solvent is unnecessary. Thus, the specification of facilities for the production can be prevented from being complicated. Moreover, no problems are caused about the separation and recovery of useful substances in the organic solvent, waste disposal, and the like.

In the present invention, the fluorophosphoric acid produced beforehand as described above is used as a reaction solvent to produce a difluorophosphate. Therefore, the quality of the difluorophosphate produced can be made more stable than in the case of reacting the oxoacid and the like of phosphorous with a hexafluorophosphate in the presence of hydrogen fluoride. Furthermore, the difluorophosphate is synthesized in the absence of at least any one of respective halides, carbonates, borates, phosphates, hydroxides, and oxides of an alkali metal, an alkaline earth metal, aluminum, and an onium, so that the generation of insoluble components resulting from the compound(s) can be prevented. Moreover, the addition of the compound(s) makes it possible that new impurities (particularly, water) are prevented from being taken therewith. As a result, the production of a higher-quality difluorophosphate can be attained.

Furthermore, in the present invention, the fluorophosphoric acid solution in which the difluorophosphate is dissolved is heated and dried to distill away the fluorophosphoric acid. Alternatively, the difluorophosphate is deposited by crystallization, the deposit is separated from the fluorophosphoric acid by solid-liquid separation, and then the fluorophosphoric acid contained in the deposit is distilled away. Thus, a high-purity difluorophosphate can easily be obtained. Thus, the present invention is industrially advantageous. As a result, the difluorophosphate obtained by the method for producing a difluorophosphate of the present invention is very useful as an additive for a nonaqueous electrolytic solution for secondary batteries, and makes it possible to supply a secondary battery having excellent performances.

EMBODIMENT OF THE INVENTION

An embodiment of the present invention will be described hereinafter.

A method for producing a difluorophosphate according to the present embodiment includes a step of producing a fluorophosphoric acid; a step of producing a difluorophosphate in a fluorophosphoric acid solution; and a step of heating and drying the fluorophosphoric acid containing the difluorophosphate to distill away a surplus of the fluorophosphoric acid, or a step of depositing a deposit in the fluorophosphoric acid by a crystallizing operation, separating the deposit from the fluorophosphoric acid by solid-liquid separation, and distilling away the fluorophosphoric acid contained in the deposit.

The above-mentioned step of producing a fluorophosphoric acid is performed by reacting hydrofluoric acid anhydride with at least one member selected from the group consisting of an oxoacid, an oxoacid anhydride, and an oxyhalide of phosphorous. In this step, hydrofluoric acid anhydride is not used in the form of a mixture with an organic solvent. It is therefore unnecessary to take a countermeasure against exposure to the organic solvent. Thus, the specification of facilities for the production can be prevented from being complicated. If an organic solvent is used, the organic solvent is mixed with acids such as the fluorophosphoric acid and hydrogen fluoride in the resultant exhaust gas or waste fluid. Accordingly, there is caused the following problem: the separation of these useful substances, and waste disposal are complicated. However, in the present embodiment, no organic solvent is used so that problems about the separation and recovery of such useful substances, waste disposal and the like can be removed.

The oxoacid of phosphorous is not particularly limited, and examples thereof include phosphoric acid, metaphosphoric acid, pyrophosphoric acid, which is obtained by dehydration-condensing phosphoric acid, chain polyphosphoric acids such as tripolyphosphoric acid, cyclic polyphosphoric acids such as trimetaphosphoric acid, phosphonic acid, and phosphinic acid. These may be used alone or in any combination of two or more thereof.

The oxoacid anhydride of phosphorous is not particularly limited, and examples thereof include respective anhydrides of the above-mentioned oxoacid of phosphorous. A more specific example thereof is diphosphorous pentoxide. The oxoacid anhydride of phosphorous that is exemplified herein may be used alone or in any combination of two or more thereof.

The oxyhalide of phosphorous is not particularly limited, and examples thereof include phosphoric trichloride, phosphoric trifluoride, phosphoric dichloride fluoride, and diphosphoryl chloride. These may be used alone or in any combination of two or more thereof.

The fluorophosphoric acid produced in the present embodiment has a composition containing phosphorous (P), oxygen (O), hydrogen (H), and fluorine (F). When the mole number of phosphorous is regarded as 1 and the respective ratios by mole of oxygen, hydrogen, and fluorine to phosphorous are represented by a, b and c, respectively, the ratio of "the mole number of P":"that of O":"that of H":"that of F" is represented by 1:a:b:c. The respective ranges of a, b and c are preferably $1 \leq a \leq 10$, $0.8 \leq b \leq 10$, and $0.8 \leq c \leq 10$; more preferably $2 \leq a \leq 5$, $0.9 \leq b \leq 5$, and $0.9 \leq c \leq 5$; and even more preferably $2.5 \leq a \leq 3$, $1 \leq b \leq 3$, and $1 \leq c \leq 3$. The respective lower limits of the mole numbers of hydrogen and fluorine to that of phosphorous can be adjusted in accordance with the quantity of hydrofluoric acid anhydride. When the above-mentioned values of b and c are each set to 0.8 or more, the resultant fluorophosphoric acid can be prevented from being too high in viscosity to cause the problem of the operability thereof. The respective upper limits of the mole numbers of oxygen, hydrogen and fluorine to that of phosphorous can be adjusted in accordance with the kind or the amount of the oxoacid of phosphorous or the oxoacid anhydride of phosphorous, and the amount of hydrofluoric acid anhydride to be mixed. When the value of each of a, b and c is set to 10 or less, it is possible to prevent the finally obtained difluorophosphate from containing a large proportion of impurities such as a monofluorophosphate or a phosphate, namely, prevent a deterioration in the quality of the product. Moreover, the composition of the fluorophosphoric acid can also be adjusted through distillation or the like.

If the ratio of the mole number of hydrogen or fluorine to that of phosphorous is lower within the range of the composition of the fluorophosphoric acid, the fluorophosphoric acid may increase in viscosity. Thus, in a case where the operation is hindered, the oxoacid and the like of phosphorous may be added batch-wise when a hexafluorophosphate is added in the subsequent step, as far as the above-mentioned composition range is satisfied. In other words, at the time of synthesizing the fluorophosphoric acid, a smaller amount than a desired amount of the oxoacid and the like of phosphorous is added and then the amount of the oxoacid and the like that is insufficient from the desired amount may be added just before or simultaneously with the time of charging the hexafluorophosphate in the subsequent step.

In the synthesis of the fluorophosphoric acid, the reaction between the oxoacid and the like of phosphorous and hydrofluoric acid anhydride is very intense. It is therefore preferred to mix these components with each other while the system is sufficiently cooled. In the mixing, it is preferred to add the oxoacid and the like of phosphorous to hydrofluoric acid anhydride. It is also preferred to add the oxoacid and the like of phosphorous and hydrofluoric acid anhydride to the fluorophosphoric acid beforehand prepared. In the latter case, it is preferred to sufficiently cool the fluorophosphoric acid beforehand prepared. Either the oxoacid and the like of phosphorous or hydrofluoric acid anhydride may be first added to the fluorophosphoric acid. The range of the cooling temperature is preferably from −40° C. to 10° C., more preferably from −30° C. to 0° C., in particular preferably from −20° C. to −5° C. When the cooling temperature is set to −40° C. or higher, the reaction system is increased in viscosity to prevent the stirring efficiency from being lowered, so that economical efficiency is also improved. On the other hand, when the cooling temperature is set to 10° C. or lower, the reactivity between the oxoacid and the like of phosphorous and hydrofluoric acid anhydride can be controlled. When local generation of heat volatilizes components in the vicinity thereof so that the reactivity cannot be controlled, the mass of the resultant fluorophosphoric acid is lowered relatively to that of the raw materials loaded (the total mass of the oxoacid(s) of phosphorous and hydrofluoric acid anhydride), whereby the yield may be lowered.

When the oxoacid and the like of phosphorous is/are added to hydrofluoric acid anhydride, the above-mentioned cooling temperature means the temperature of the oxoacid and the like of phosphorous. When the oxoacid and the like of phosphorous and hydrofluoric acid anhydride are added to the fluorophosphoric acid, the cooling temperature means the temperature of the fluorophosphoric acid.

About the reactivity between the oxoacid and the like of phosphorous and hydrofluoric acid anhydride at the time of mixing them, the reduction percentage by mass of the fluorophosphoric acid can be used as an index thereof. The reduction percentage by mass of the fluorophosphoric acid is preferably 5% by mass or less, more preferably 2.5% by mass or less, even more preferably 1.5% by mass or less, in particular 1% by mass or less. The reduction percentage (%) by mass of the fluorophosphoric acid can be calculated in accordance with the following: ((mass of raw materials loaded)−(mass of fluorophosphoric acid))/(mass of raw materials loaded)×100.

The cooling time when the fluorophosphoric acid is synthesized is appropriately set as required, considering a relationship thereof with the cooling temperature. The cooling is preferably performed until the addition of the oxoacid and the like of phosphorous to hydrofluoric acid anhydride is finished. More specifically, the time preferably ranges from 2 hours to 10 hours, more preferably from 3 hours to 8 hours, in particular preferably from 3.5 hours to 7.5 hours.

The step of producing a difluorophosphate is performed by reacting a hexafluorophosphate with the fluorophosphoric acid. This reaction is conducted in the fluorophosphoric acid solution. Thus, no organic solvent is used so that the fluorophosphoric acid solution fulfils a function as a reaction solvent. In a conventional method for producing a difluorophosphate, a synthesis example is also known in which no organic solvent is used. For example, a method is performed in which hydrogen fluoride is added to lithium hexafluorophosphate, lithium fluoride and diphosphorous pentoxide to react these components with one another, thereby producing lithium difluorophosphate. However, in such a synthesis, the reaction advances very intensely to cause an inconvenience that the resultant lithium difluorophosphate is unstable in quality. This is considered because the intense reaction causes local generation of heat, or the like, whereby the temperature distribution of the inside of the reaction vessel is uneven, and thus conditions for the reaction are not easily stabilized. However, in the present embodiment, the beforehand synthesized fluorophosphoric acid is used as a reaction solvent to react this fluorophosphoric acid and the hexafluorophosphate with each other, so that the generation of unevenness is reduced in the temperature distribution of the inside of the reaction vessel. Thus, the reaction conditions can be stabilized. As a result, the resultant difluorophosphate can be made more stable in quality.

The step of producing a difluorophosphate is performed in a substantial absence of at least any one of respective halides, carbonates, borates, phosphates, hydroxides, and oxides of an alkali metal, an alkaline earth metal, aluminum, and an onium (hereinafter, referred to as the halides and the like of an alkali metal and the like). In the present embodiment, no organic solvent is used in the production of the difluorophosphate; therefore, it is possible to prevent the generation of insoluble components resulting from the halides and the like of an alkali metal and the like by no addition of the halide and the like of an alkali metal and the like. Moreover, the raw materials used are reduced so that the method of the present embodiment is improved in productivity, and new impurities (particularly, water) can be prevented from being taken into the system. As a result, a high-quality difluorophosphate can be produced.

Examples of the alkali metal include Li, Na, K, Rb and Cs. Examples of the alkaline earth metal include Be, Mg, Ca, Sr and Ba. Examples of the onium include ammonium, phosphonium, and sulfonium. Examples of the ammonium include $NH_4^+$, secondary ammonium, tertiary ammonium, and quaternary ammonium. Examples of the quaternary ammonium include tetraalkylammoniums (such as tetramethylammonium, tetraethylammonium, and triethylmethylammonium), imidazolium, pyrazolium, pyrimidinium, triazolium, pyridazinium, thiazolium, oxazolium, pyrimidinium, and pyrazinium. Examples of the phosphonium include tetraalkylphosphoniums (such as tetramethylphosphonium and tetraethylphosphonium). Examples of the sulfonium include trialkylsulfoniums (such as trimethylsulfonium and triethylsulfonium).

Examples of the halides include fluorides, chlorides, bromides, and iodides. Examples of the borates include orthoborate, metaborate, diborate, tetraborate, pentaborate, and octaborate. Examples of the phosphates include orthophosphate, monohydrogenphosphate, dihydrogenphosphate, metaphosphate, monohydrogenmetaphosphate, dihydrogenmetaphosphate, phosphenate, and metaphosphonate.

The mixing of the hexafluorophosphate with the fluorophosphoric acid solution is preferably performed by adding the hexafluorophosphate to the fluorophosphoric acid solution. The addition of the hexafluorophosphate may be appropriately decided in light of the reaction situation. Thus, a predetermined amount thereof may be added at one time, or may be added in plural portions. When the hexafluorophosphate is added to the fluorophosphoric acid solution, the liquid temperature of the fluorophosphoric acid solution preferably ranges from −40° C. to 100° C., more preferably from −30° C. to 90° C., in particular preferably from −20° C. to 80° C. By setting the liquid temperature to 100° C. or lower, the fluorophosphoric acid solution can be prevented from being decomposed by heat when the hexafluorophosphate contacts the fluorophosphoric acid solution. On the other hand, by setting the liquid temperature to −40° C. or higher, the reaction between the hexafluorophosphate and the fluorophosphoric acid can be promoted.

The conditions for the reaction between the hexafluorophosphate and the fluorophosphoric acid may be set at will. The reaction temperature preferably ranges from 0° C. to 300° C., more preferably from 0° C. to 200° C., in particular preferably from 0° C. to 180° C. The reaction may be conducted under atmospheric pressure or under reduced pressure. The reaction time is usually from 0.5 hours to 5 hours. The time may be appropriately set in accordance with the reactor and the amounts changed.

In order to enhance the efficiency of the reaction between the hexafluorophosphate and the fluorophosphoric acid, reflux may be performed. The temperature of a tower for the reflux preferably ranges from −50° C. to 10° C., more preferably from −40° C. to 8° C., in particular from −30° C. to 5° C.

The hexafluorophosphate is at least one selected from the group consisting of an alkali metal, alkaline earth metal, and onium.

The alkali metal in the hexafluorophosphate is not particularly limited, and examples thereof include Li, Na, K, Rb, and Cs. These may be used alone or in any combination of two or more thereof. Of these alkali metals, Li, Na and K are preferred from the viewpoints of costs and availability.

The alkaline earth metal is not particularly limited, and examples thereof include Be, Mg, Ca, Sr, Ba and Al. These may be used alone or in any combination of two or more thereof. Of these alkaline earth metals, Mg, Ca, Ba, and Al are preferred from the viewpoints of costs and safety.

The onium is not particularly limited, and examples thereof include ammonium, phosphonium, and sulfonium. These may be used alone or in any combination of two or more thereof.

The mixing ratio of the hexafluorophosphate to the fluorophosphoric acid solution may be set in accordance with the step of distilling away the fluorophosphoric acid, which is performed after the present step. Specifically, the mixing ratio is varied in accordance with whether the step performed after the step of producing the difluorophosphate is the step of distilling a surplus of the fluorophosphoric acid while the fluorophosphoric acid solution is heated and dried, or the step of depositing the difluorophosphate in the fluorophosphoric acid solution by crystallization, and subsequently separating the difluorophosphate by solid-liquid separation to distill away the fluorophosphoric acid.

When the next step is the step of distilling a surplus of the fluorophosphoric acid while the fluorophosphoric acid solution is heated and dried, the ratio of the mole number of hexafluorophosphate ions in the hexafluorophosphate to that of phosphorous in the fluorophosphoric acid, represented by x, preferably satisfies $0.3 \leq x \leq 0.7$, more preferably $0.35 \leq x \leq 0.65$, even more preferably $0.4 \leq x \leq 0.6$. When the value x is set to 0.3 or more, the amount of the fluorophosphoric acid to be distilled away can be prevented from being increased relatively to the amount of the resultant difluorophosphate so that the productivity is lowered. On the other hand, when the value x is set to 0.7 or less, the remaining unreacted hexafluorophosphate, which is as a raw material, can be decreased.

When the next step is the step of performing the solid-liquid separation after the crystallization of the difluorophosphate, a fraction of the difluorophosphate that corresponds to a solubility difference in the fluorophosphoric acid depending on the temperature is recovered. The hexafluorophosphate may be reacted with the fluorophosphoric acid in a molar amount corresponding to the saturated solubility of the difluorophosphate in the fluorophosphoric acid. Thus, the value x preferably satisfies $0.05 \leq x \leq 0.5$, more preferably $0.1 \leq x \leq 0.45$, in particular preferably $0.15 \leq x \leq 0.4$.

When a large amount of the hexafluorophosphate, which is a raw material, is added, a surplus of the hexafluorophosphate remains with being unreacted so that a mixture of the difluorophosphate and the hexafluorophosphate is obtained. In a case where the hexafluorophosphate is, for example, lithium hexafluorophosphate, the resultant product is a mixture of lithium hexafluorophosphate and lithium difluorophosphate when the amount of lithium hexafluorophosphate loaded is large.

In the present embodiment, after the step of producing the difluorophosphate, the step of distilling away the remaining fluorophosphoric acid is performed. The method for distilling away the fluorophosphoric acid is either a method of heating and drying the fluorophosphoric acid including the difluorophosphate to distill away a surplus of the fluorophosphoric acid, or a method of depositing a deposit in the fluorophosphoric acid solution by crystallization, separating the deposit from the fluorophosphoric acid by solid-liquid separation, and distilling away the fluorophosphoric acid contained in the deposit.

In the former method, the heating temperature preferably ranges from 40° C. to 200° C., more preferably from 50° C. to 180° C., in particular preferably from 60° C. to 150° C. When the heating temperature is set to 40° C. or higher, the fluorophosphoric acid can be prevented from being insufficiently distilled away. On the other hand, when the heating temperature is set to 200° C. or lower, a problem about the durability of the drying machine can be avoided. The heating time is appropriately set as required in accordance with the heating temperature and other conditions. Specifically, the time preferably ranges from 2 hours to 35 hours, more preferably from 3 hours to 30 hours, in particular preferably from 4 hours to 25 hours.

The heating and drying are preferably performed under an atmosphere of an inert gas such as nitrogen or argon, or under a gas flow of an inert gas. This makes it possible to prevent the following: water in the atmosphere is dissolved in the fluorophosphoric acid solution to hydrolyze ions of the difluorophosphate so that impurities, such as monofluorophosphate ions or phosphate ions, are generated to cause a change in the composition. From the viewpoint of the drying machine used, the heating and drying are performed under normal pressure. However, in order to promote the distillation-off of a volatile substance (fluorophosphoric acid), the drying may be performed under reduced pressure. From the viewpoint of drying efficiency, a mixing operation may be made, an example thereof being the vibrating, swinging or stirring of the fluorophosphoric acid including the difluorophosphate during drying.

In the latter method, the difluorophosphate in the fluorophosphoric acid is first crystallized. The crystallization is performed by heating or cooling the fluorophosphoric acid to make the difluorophosphate into a saturated state or a super saturated state. In this way, a crystal of the difluorophosphate is deposited in the fluorophosphoric acid. The crystallizing temperature may be appropriately set as required. Specifically, the temperature preferably ranges from −100° C. to 100° C., more preferably for −80° C. to 80° C., in particular preferably from −50° C. to 50° C.

After the crystal of the difluorophosphate is deposited, the resultant is subjected to solid-liquid separation. The solid-liquid separation is performed by, for example, filtration. The deposit thus obtained contains the fluorophosphoric acid used as a solvent for the crystallization. It is therefore necessary to remove the fluorophosphoric acid by heating and drying. In the present embodiment, impurities produced as by-products by the heating and drying can also be removed. At this time, the heating and drying temperature preferably ranges from 40° C. to 200° C., more preferably from 50° C. to 180° C., in particular preferably from 60° C.

to 150° C. When the heating temperature is set to 40° C. or higher, the fluorophosphoric acid can be prevented from being insufficiently distilled away. On the other hand, when the heating temperature is set to 200° C. or lower, a problem about the durability of the drying machine can be avoided. The heating time is appropriately set as required in accordance with the heating temperature and other conditions. Specifically, the time preferably ranges from 2 hours to 35 hours, more preferably from 3 hours to 30 hours, in particular preferably from 4 hours to 25 hours.

The heating and drying are preferably performed under an atmosphere of an inert gas such as nitrogen or argon, or under a gas flow of an inert gas. This makes it possible to prevent the following: water in the atmosphere is dissolved in the fluorophosphoric acid so that the ratio between the hydrogen atoms and the oxygen atoms is varied to cause a change in the composition. From the viewpoint of the drying machine used, the heating and drying are performed under normal pressure. However, in order to promote the distillation-off of a volatile substance (fluorophosphoric acid), the drying may be performed under reduced pressure. From the viewpoint of drying efficiency, a mixing operation may be made, an example thereof being the vibrating, swinging or stirring of the fluorophosphoric acid including the difluorophosphate during drying. This makes it possible to distill away the fluorophosphoric acid and impurities contained in the deposit to provide a high-purity difluorophosphate.

The fluorophosphoric acid solution obtained by the solid-liquid separation dissolves a non-deposited fraction of the difluorophosphate. For this reason, the fluorophosphoric acid solution after the solid-liquid separation can be reused. In the fluorophosphoric acid solution after the solid-liquid separation, the concentration of the difluorophosphate in the fluorophosphoric acid solution is lowered; thus, the reuse of this fluorophosphoric acid solution can be attained by adding thereto a raw-material salt (hexafluorophosphate) corresponding to the amount lowered, or a raw-material salt and a fluorophosphoric acid. In this way, the fluorophosphoric acid and the hexafluorophosphate are reacted with each other; and then in the same manner as described above, a step is repeated in which the fluorophosphoric acid solution containing the difluorophosphate is heated and dried to distill away a surplus of the fluorophosphoric acid. Alternatively, a step is repeated in which by crystallization, the difluorophosphate is deposited in the fluorophosphoric acid solution and then this salt is separated by solid-liquid separation, and subsequently the salt is heated and dried to distill away the fluorophosphoric acid. This makes it possible to efficiently produce a high-purity difluorophosphate.

EXAMPLES

Hereinafter, preferred examples of this invention will be exemplarily described in detail. However, the scope of this invention is not limited only into raw materials, blending amounts and others that are described in the examples, as far as the present specification does not include any restricted description thereabout.

Example 1

<Preparation of Fluorophosphoric Acid>

Into a PFA bottle having an internal volume of 1 L was fractionated 100 g of HF. While the liquid HF was stirred, the system was cooled to −10° C. Thereto was slowly added 284 g of $P_2O_5$ in small portions. The cooling was continued for 1 hour until the addition of $P_2O_5$ was terminated. Furthermore, in order to completely dissolve $P_2O_5$ added, the resultant mixed solution was warmed at 80° C. for 5 hours while stirred under a nitrogen atmosphere. This provided 380 g of a fluorophosphoric acid solution.

<Synthesis of Lithium Difluorophosphate>

Into a PFA vessel having an internal volume of 1 L was weighed 138 g of the fluorophosphoric acid solution. Thereto was added 107 g of lithium hexafluorophosphate under a nitrogen atmosphere. At the time of the addition of lithium hexafluorophosphate, the liquid temperature of the fluorophosphoric acid solution was set to 30° C. Thereafter, under a nitrogen gas flow, the content in the vessel was heated and dried at 130° C. for 20 hours to be concentrated to dryness. In this way, 73.5 g of a white crystal was obtained.

Ion chromatography (ICS-1000, manufactured by Dionex Corp.; column AS-23) was used to subject the resultant white crystal to anion analysis. As a result, it was verified that the resultant crystal was lithium difluorophosphate. A relative area ratio of difluorophosphate ions was used as an index of the purity of lithium difluorophosphate. The purity of lithium difluorophosphate obtained was 98% according to the relative area.

Example 2

<Preparation of Fluorophosphoric Acid>

In the same way as in Example 1, 380 g of a fluorophosphoric acid solution was obtained.

<Synthesis of Lithium Difluorophosphate>

Into a PFA vessel having an internal volume of 1 L was weighed 126 g of the fluorophosphoric acid solution. Thereto was added 50 g of lithium hexafluorophosphate under a nitrogen atmosphere. At the time of the addition of lithium hexafluorophosphate, the liquid temperature of the fluorophosphoric acid solution was set to 50° C. Furthermore, the fluorophosphoric acid solution after lithium hexafluorophosphate was added thereto was cooled to −20° C. to be subjected to crystallization. This provided a slurry solution of the fluorophosphoric acid solution and a deposit.

Subsequently, 161 g of the resultant slurry solution was subjected to solid-liquid separation under a nitrogen atmosphere by filtration to provide 15.5 g of a white crystal containing the reaction mother liquid. Furthermore, the white crystal containing the reaction mother liquid was transferred into a PFA bottle, and the content therein was heated and dried at 130° C. under a nitrogen gas flow for 20 hours to provide 9.5 g of a white crystal.

The ion chromatography was used to subject the resultant white crystal to anion analysis. As a result, it was verified that the resultant crystal was lithium difluorophosphate. The purity thereof was 98% according to the relative area.

Comparative Example 1

Into a PFA vessel having an internal volume of 1 L was weighed 36 g of lithium hexafluorophosphate (reagent manufactured by Stella Chemifa Corp.). Thereto were added 11.8 g of lithium fluoride (reagent manufactured by Stella Chemifa Corp.), and 66.7 g of diphosphorous pentoxide (reagent manufactured by Wako Pure Chemical Industries, Ltd.). Subsequently, thereto was added 300 g of hydrofluoric acid anhydride, and this system was heated at 130° C. for 2 hours to distill off a surplus of the solvent, and by-products of reaction. Thereafter, the system was cooled to room temperature to provide 25 g of a crystal of lithium difluorophosphate. Furthermore, in the same way as in Example 1, the crystal was subjected to anion analysis. As a result, the purity of the resultant lithium difluorophosphate crystal was 89% according to the relative area.

Example 3

<Preparation of Fluorophosphoric Acid>

Into a PFA bottle having an internal volume of 1 L was fractionated 100 g of HF. The system was cooled to 10° C. with stirring. Thereto was slowly added 284 g of $P_2O_5$ in small portions. The cooling was continued for 1 hour until the addition of $P_2O_5$ was terminated. Furthermore, in order to completely dissolve $P_2O_5$ added, the resultant mixed solution was warmed at 80° C. for 5 hours while stirred under a nitrogen atmosphere. This provided 367 g of a fluorophosphoric acid solution.

<Synthesis of Lithium Difluorophosphate>

Into a PFA vessel having an internal volume of 1 L was weighed 135 g of the fluorophosphoric acid solution. Thereto was added 105 g of lithium hexafluorophosphate under a nitrogen atmosphere. At the time of the addition of lithium hexafluorophosphate, the liquid temperature of the fluorophosphoric acid solution was set to 30° C. Thereafter, under a nitrogen gas flow, the content in the vessel was heated and dried at 130° C. for 20 hours to be concentrated to dryness. In this way, 72.3 g of a white crystal was obtained.

Ion chromatography (ICS-1000, manufactured by Dionex Corp.; column AS-23) was used to subject the resultant white crystal to anion analysis. As a result, it was verified that the resultant crystal was lithium difluorophosphate. A relative area ratio of difluorophosphate ions was used as an index of the purity of lithium difluorophosphate. The purity of lithium difluorophosphate obtained was 97% according to the relative area.

Example 4

<Preparation of Fluorophosphoric Acid>

Into a PFA bottle having an internal volume of 1 L was fractionated 100 g of HF. While the liquid HF was stirred, the system was cooled to 20° C. Thereto was slowly added 284 g of $P_2O_5$ in small portions. The cooling was continued for 1 hour until the addition of $P_2O_5$ was terminated. Furthermore, in order to completely dissolve $P_2O_5$ added, the resultant mixed solution was warmed at 80° C. for 5 hours while stirred under a nitrogen atmosphere. This provided 362 g of a fluorophosphoric acid solution.

<Synthesis of Lithium Difluorophosphate>

Into a PFA vessel having an internal volume of 1 L was weighed 136 g of the fluorophosphoric acid solution. Thereto was added 106 g of lithium hexafluorophosphate under a nitrogen atmosphere. At the time of the addition of lithium hexafluorophosphate, the liquid temperature of the fluorophosphoric acid solution was set to 30° C. Thereafter, under a nitrogen gas flow, the content in the vessel was heated and dried at 130° C. for 20 hours to be concentrated to dryness. In this way, 72.4 g of a white crystal was obtained.

Ion chromatography (ICS-1000, manufactured by Dionex Corp.; column AS-23) was used to subject the resultant white crystal to anion analysis. As a result, it was verified that the resultant crystal was lithium difluorophosphate. A relative area ratio of difluorophosphate ions was used as an index of the purity of lithium difluorophosphate. The purity of lithium difluorophosphate obtained was 95% according to the relative area.

What is claimed is:

1. A method for producing a difluorophosphate, comprising:
   a step of producing a fluorophosphoric acid solution by reacting hydrofluoric acid anhydride containing no organic solvent with at least one member selected from the group consisting of an oxoacid, an oxoacid anhydride, and an oxyhalide of phosphorous;
   a step of producing a difluorophosphate in the fluorophosphoric acid solution by adding a hexafluorophosphate to the fluorophosphoric acid solution in the absence of any and all members selected from the group consisting of respective halides, carbonates, borates, phosphates, hydroxides, and oxides of an alkali metal, an alkaline earth metal, aluminum, and an onium; and
   a step of heating and drying the fluorophosphoric acid solution containing the difluorophosphate to distill away a fluorophosphoric acid, or a step of depositing the difluorophosphate in the fluorophosphoric acid solution by crystallization, subsequently separating the difluorophosphate by solid-liquid separation, and further distilling away a fluorophosphoric acid contained in the difluorophosphate after the solid-liquid separation.

2. The method for producing a difluorophosphate according to claim 1, wherein in the step of producing a fluorophosphoric acid solution, the at least one member selected from the group consisting of an oxoacid, an oxoacid anhydride, and an oxyhalide of phosphorous is mixed with the hydrofluoric acid anhydride while the at least one member and the hydrofluoric acid anhydride are cooled in the range of −40° C. to 10° C.

3. The method for producing a difluorophosphate according to claim 2, wherein the step of producing a difluorophosphate in the fluorophosphoric acid solution is performed by keeping the temperature of the fluorophosphoric acid solution in the range of −40° C. to 100° C. at the time of adding the hexafluorophosphate to the fluorophosphoric acid solution.

4. The method for producing a difluorophosphate according to claim 3, wherein any of the following steps is repeated: a step of adding, to the fluorophosphoric acid solution after the solid-liquid separation, a hexafluorophosphate, or a hexafluorophosphate and a fluorophosphoric acid, and subsequently heating and drying the resultant to distill away a surplus of the fluorophosphoric acid; and a step of separating, by solid-liquid separation, a deposit deposited by crystallizing the fluorophosphoric acid including the difluorophosphate, and further distilling away the fluorophosphoric acid contained in the deposit.

5. The method for producing a difluorophosphate according to claim 1, wherein the hexafluorophosphate is lithium hexafluorophosphate.

6. The method for producing a difluorophosphate according to claim 1, wherein the hexafluorophosphate is lithium hexafluorophosphate.

* * * * *